(12) United States Patent
Yan et al.

(10) Patent No.: US 7,094,728 B2
(45) Date of Patent: Aug. 22, 2006

(54) METHOD FOR CONTROL OF WASHCOAT DISTRIBUTION ALONG CHANNELS OF A PARTICULATE FILTER SUBSTRATE

(75) Inventors: Jiyang Yan, Broken Arrow, OK (US); Scott F. Reid, Claremore, OK (US); Ming Wei, Broken Arrow, OK (US)

(73) Assignee: Delphi Technologies, Inc., Troy, MI (US)

( * ) Notice: Subject to any disclaimer, the term of this patent is extended or adjusted under 35 U.S.C. 154(b) by 491 days.

(21) Appl. No.: 10/460,606

(22) Filed: Jun. 11, 2003

(65) Prior Publication Data

US 2004/0254072 A1  Dec. 16, 2004

(51) Int. Cl.
*B01J 37/02* (2006.01)

(52) U.S. Cl. .............. 502/300; 502/302; 502/305; 502/325; 502/340; 502/344; 502/349; 502/353; 502/355; 502/514; 502/527.12

(58) Field of Classification Search ........... 502/340, 502/344, 353, 305, 325, 349, 355, 302, 300, 502/527.12, 514
See application file for complete search history.

(56) References Cited

U.S. PATENT DOCUMENTS

| | | | |
|---|---|---|---|
| 6,013,599 A * | 1/2000 | Manson ............... | 502/340 |
| 6,365,118 B1 | 4/2002 | Kharas et al. .......... | 423/213.2 |
| 6,391,822 B1 | 5/2002 | Dou et al. ............. | 502/325 |
| 6,468,484 B1 | 10/2002 | Dou et al. ............. | 423/213.2 |
| 6,497,092 B1 | 12/2002 | Theis .................. | 60/274 |
| 6,613,299 B1 * | 9/2003 | Dang et al. ........... | 423/239.1 |
| 2005/0176581 A1 * | 8/2005 | Ohno et al. ........... | 502/439 |

FOREIGN PATENT DOCUMENTS

| | | |
|---|---|---|
| EP | 0 942 157 B1 | 5/2002 |
| EP | 1 270 886 A1 | 1/2003 |
| EP | 1 286 028 A2 | 2/2003 |

* cited by examiner

*Primary Examiner*—Stanley S. Silverman
*Assistant Examiner*—Timothy C. Vanoy
(74) *Attorney, Agent, or Firm*—Paul L. Marshall

(57) ABSTRACT

Disclosed herein is a method of distributing a washcoat along channels of a particulate filter substrate, the method including: forcing a washcoat slurry a predetermined distance into the channels, the predetermined distance being less than or equal to the full length of the channels; clearing an excess amount of washcoat slurry from the channels; and arranging a remainder of the washcoat slurry within the channels, the arranging including applying a first vacuum to a first end of the particulate filter substrate after the clearing. In one embodiment the clearing includes applying a second vacuum to a second end of the particulate filter substrate. In another embodiment, the clearing includes pulling the excess washcoat slurry from the channels. The predetermined distance may be less than or equal to the full length of the channels. The arranging may provide a layer of a washcoat composition comprising a catalytically active material arranged anisotropically along a length of the channels of the particulate filter substrate.

12 Claims, 2 Drawing Sheets

METHOD FOR CONTROL OF WASHCOAT DISTRIBUTION ALONG CHANNELS OF A PARTICULATE FILTER SUBSTRATE

BACKGROUND

Federal and state requirements have mandated substantial reductions in carbon particulate matter (PM, so called soot), hydrocarbons, nitrogen oxides and carbon monoxide emission for gasoline and diesel engines. Attempts at reducing such emissions, in particular attempts to reduce particulate emissions from diesel engines, include catalytic diesel particulate filters (DPF) in which a catalytically active material is dispersed within a substrate in the particulate filter. The catalyst promotes removal (e.g., oxidation) of particulates and other pollutants of diesel fuel combustion in the exhaust gas stream.

Applying a catalytic material (also referred to herein as a washcoat) to the DPF substrate is one of the most promising technologies for effective removal (combustion) of trapped PM. In general, better catalytic performance is achieved by increasing washcoat loading so as to increase the concentration of catalytically active material present. However, an increase in washcoat loading can result in an increase in flow restriction when exhaust gas flows by the catalytic particulate filter. This increase of exhaust gas flow restriction results in an increase in exhaust line backpressure, which could be detrimental to engine performance and fuel economy. In general, the lower the backpressure, the better the engine performance and fuel economy will be. Accordingly, a need exists for a particulate filter that provides for reduction of particulates in the exhaust gas while minimizing backpressure caused by the particulate filter.

SUMMARY OF THE INVENTION

Disclosed herein is a method of distributing a washcoat along channels of a particulate filter substrate, the method including: forcing a slurry traveling a predetermined distance in the channels of DPF substrates, the predetermined distance being less than or equal to the full length of the channels; clearing an excess amount washcoat slurry from the channels; and arranging a remainder of the washcoat slurry within the channels, the arranging including applying a first vacuum to a first end of the particulate filter substrate after the clearing. In one embodiment the clearing includes applying a second vacuum to a second end of the particulate filter substrate. In another embodiment, the clearing includes pulling the excess washcoat slurry from the channels. The predetermined distance may be less than or equal to the full length of the channels. The arranging may provide a layer of a washcoat composition comprising a catalytically active material arranged anisotropically along a length of the channels of the particulate filter substrate.

In another aspect, a method of distributing a washcoat along channels of a particulate filter substrate includes: forcing a slurry traveling a predetermined distance in the channels of DPF substrate; applying a first vacuum to a first end of the particulate filter substrate to clear an excess amount washcoat slurry from the channels; and applying a second vacuum to a second end of the particulate filter substrate to arrange a remainder of the washcoat slurry within the channels. The washcoat may be forced into the channels through the first or second end of the particulate filter substrate, and the predetermined distance may be less than or equal to the full length of the channels. In one embodiment, a third vacuum is applied to at least one of the first end and the second end of the particulate filter substrate to further arrange the remainder of the washcoat slurry within the channels.

FIGURES

DETAILED DESCRIPTION

Figure 1:
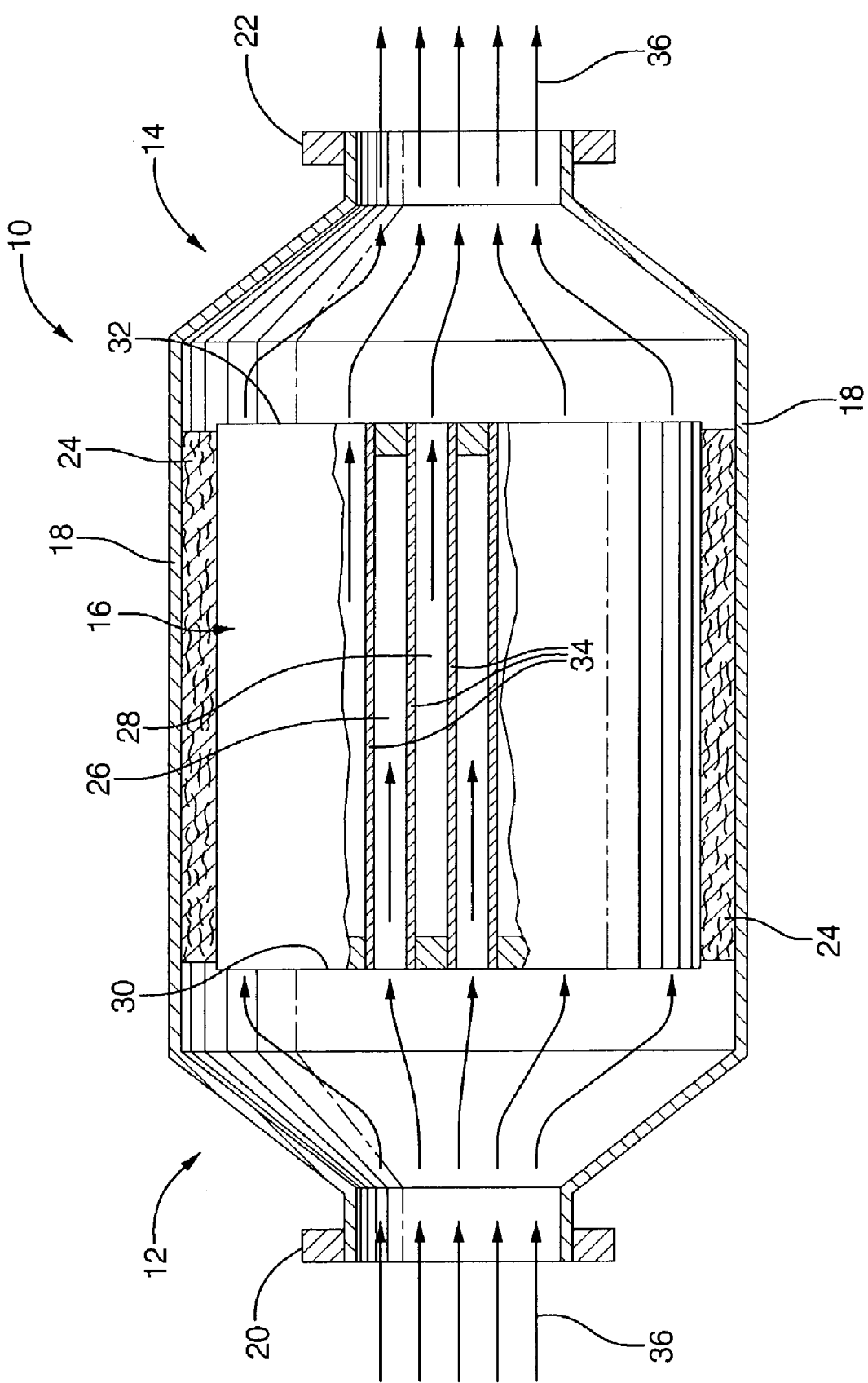
FIG. 1 shows a cross-sectional view of a particulate filter including a catalytic particulate filter substrate, which is shown in partial cut-away view.

Referring to FIG. 1, a particulate filter 10 may be part of an exhaust gas emission control system in which an inlet 12 on the particulate filter 10 is in fluid communication with an exhaust manifold of an internal combustion engine (e.g., a diesel engine), and an outlet 14 on the filter 10 is in fluid communication with an exhaust gas destination, such as atmosphere. In addition, the system may comprise various other emission control devices including catalytic converters, evaporative emission devices, scrubbing devices, adsorbers/absorbers, non-thermal plasma reactors, mufflers, and the like, as well as combinations comprising at least one of the foregoing devices.

The particulate filter 10 comprises a particulate filter substrate 16 enclosed within a housing or canister 18. The canister 18 may have an input collar 20 connectable to the exhaust manifold or other components in the system such as a turbocharger, and an output collar 22 connectable to the tailpipe or other components in the system. Located between the particulate filter substrate 16 and the interior of the canister 18 is a retention or support material 24 that supports and protects the particulate filter substrate 16, and insulates the canister 18 from both the high exhaust gas temperatures and the exothermic catalytic reaction occurring within the particulate filter substrate 16.

Figure 2:
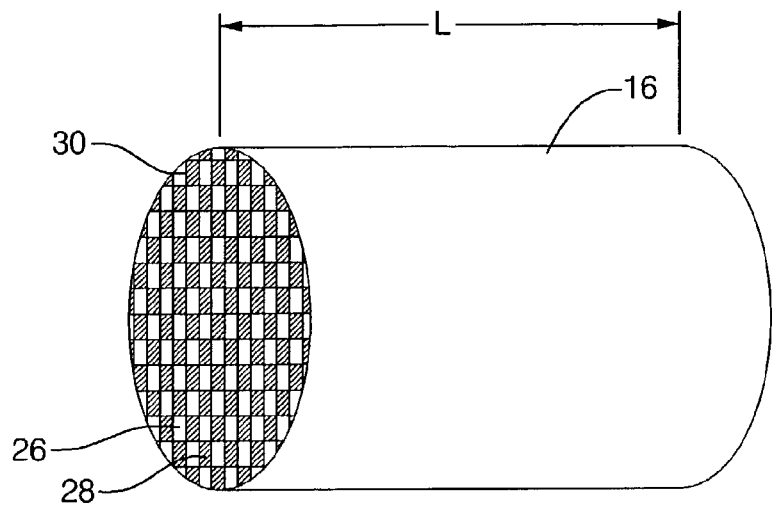
FIG. 2 shows a perspective view of an embodiment of the catalytic particulate filter substrate.

The particulate filter substrate 16, which is shown in a partial cut-away view, may comprise a gas permeable ceramic material having a honeycomb structure consisting of a plurality of channels, preferably parallel channels. The channels may be divided into alternating inlet channels 26 and outlet channels 28. The inlet channels 26 are open at an inlet end 30 of the particulate filter substrate 16 and preferably plugged at an outlet end 32 of the substrate 16. Conversely, outlet channels 28 are preferably plugged at the inlet end 30 and open at the outlet end 32. The inlet and outlet channels 26, 28 are formed and separated by thin porous longitudinal sidewalls 34, which permit exhaust gases 36 to pass from the inlet channels 26 to the outlet channels 28 along their length. As shown in FIG. 2, the particulate filter substrate 16 may be a generally cylindrical structure with a plurality of inlet and outlet channels 26, 28 dispersed therein. The inlet and outlet channels 26, 28 may have a substantially rectangular cross-sectional shape. However, the channels 26,28 may have any multi-sided or rounded shape, with substantially square, triangular, hexagonal, or similar geometries. The dimensions of the inlet and outlet channels 26, 28 depend on various design considerations, including space limitations, projected washcoat loading, and end use requirements.

The particulate filter substrate 16 may comprise any material designed for use in the environment and which may remove particulate matter from a gaseous stream. Some possible materials include ceramics (e.g., extruded ceramics, such as cordierite, aluminum oxide, aluminum phosphate and the like), metals (e.g., extruded, sintered metals), silicon nitrate and silicon carbide, and the like, and mixtures comprising at least one of the foregoing materials.

Dispersed on the sidewalls 34 forming the inlet and outlet channels 26, 28 is one or more washcoat compositions comprising one or more catalytically active materials. While the washcoat compositions are said to be dispersed "on" the sidewalls 34, it is possible that at least a portion of the washcoat compositions could be absorbed within the sidewalls 34. Thus, as used herein, a washcoat dispersed on the sidewalls includes washcoat dispersed on and/or in the sidewalls.

The washcoat compositions need not be present along the entire length of the channels 26, 28, and may be dispersed in one or both of the inlet and outlet channels 26, 28. For example, a washcoat may be coated throughout the length "L" of the inlet channel 26, or only through part of the length "L" near the inlet end 30. For certain applications the washcoat may also be coated through the entire length "L", or a portion of the length "L", of the outlet channels 28. The choice of the locations, amount, and type of washcoat depend on the application of the particulate filter 10.

The catalytic material used in the washcoat composition may be any catalyst capable of reducing the concentration of at least one component in the exhaust gas. Thus, the catalyst may comprise one or more catalytic materials. Possible catalyst materials include metals, such as barium, cesium, vanadium, molybdenum, niobium, tungsten platinum, palladium, rhodium, iridium, ruthenium, zirconium, yttrium, cerium, lanthanum, and the like, as well as oxides, alloys, and combinations comprising at least one of the foregoing catalyst materials, and other catalysts.

In operation, exhaust gas 36 generated by the internal combustion engine passes through the exhaust gas manifold into the inlet channels 26 of the particulate filter substrate 16. The exhaust gas passes through the sidewalls 34 into the outlet channels 28, and the porous sidewalls 34 permit the exhaust gas 36 to pass from the inlet channels 26 to the outlet channels 28 such that the inlet channels 26 collect particulate matter contained in the exhaust gas 36. The catalyst material dispersed on sidewalls 34 promotes removal (e.g., oxidation) of the particulate matter from the exhaust gas 36. From the outlet channels 28, the exhaust gas 36 flows toward the exhaust gas destination.

It has been discovered that backpressure caused by the particulate filter 10 can be adjusted using an anisotropic washcoat application throughout the length "L" of the inlet and/or outlet channels 26, 28. In other words, the loading (concentration) of catalytic material varies along the length "L" of the inlet and/or outlet channels 26, 28. The anisotropy need not be linear or uniform, and preferably only varies from one location (e.g., the inlet end 30) of the particulate filter substrate 16 to another location (e.g., the outlet end 32) of the particulate filter substrate 16.

The additional backpressure caused by washcoating the particulate filter substrate 16 is mainly determined by the thickness of the washcoat dispersed on substrate wall surface or in the substrate porous wall where exhaust gas is passing by. Thus, the backpressure of caused by the coated particulate filter substrate 16 may be controlled by selectively locating the washcoat in the particulate filter substrate 16. For example, to minimize exhaust gas backpressure, washcoat may be heavily applied in a portion of the substrate channel. This portion of the channel will have relatively high flow restriction due to the washcoat loading. When exhaust gas flows through the channel, it will tend to pass through another portion of the channel that does not contain washcoat or that contains relatively less washcoat, which results in less flow restriction. The anisotropy in the catalytic material concentration provides for an increase in catalytic loading without causing a substantial increase in backpressure, as compared to a uniform loading of the catalytic material dispersed throughout.

In general, the more catalytically active material that can be applied to the substrate, the better activity the converter can achieve. In addition, selectively locating the washcoat in one portion of the substrate may also help to improve the catalytic activity of particulate matter reduction. For example, temperature is critical for ignition of particulate matter combustion, regardless of whether it is performed catalytically or non-catalytically. In the catalytic converter design of FIG. 1, inlet exhaust gas is always hotter than outlet exhaust gas due to the heat loss to the converter. Locating the catalyst at inlet end 30 will allow the catalyst to heat up faster and will allow for the faster catalytic ignition of soot. Thus, controlling the washcoat location is beneficial to both lowering backpressure of converter and improving particulate matter reduction performance.

To control washcoat distribution along the inlet and/or outlet channels 26, 28 of the particulate filter substrate 16, the following method has been developed. First, the predetermined amount of slurry is to be applied into particulate filter substrate 16 is placed with an end that is selected as that end which is contiguous with the channels to be washcoated. For example, if the inlet channels 26 are to be washcoated, the inlet end 30 is placed on the coating device, and if the outlet channels 28 are to be washcoated, the outlet end 32 is placed on the coating device. The washcoat slurry is forced into substrate such that it extends into the inlet or outlet channels 26, 28 a predetermined distance along the length "L" into the filter substrate 16 (e.g., 30% of L, 50% of L, 70% of L, 100% of L). The washcoat slurry comprises the catalytically active material, binders, supporting material, and the like. After the predetermined amount of washcoat slurry is forced into the channels 26 or 28 of the particulate filter substrate 16, the excess slurry is then cleared from the coated channels by applying a vacuum to either the inlet end 30 or outlet end 32 of the particulate filter substrate 16, depending on the desired location of the washcoat within the coated channels. Additional vacuum clearings may also be applied to the opposite end 30 or 32 of the filter substrate 16 to further control the location of the washcoat. With this process, excessive slurry is removed and the remainder of the material is arranged within the coated channels of the particulate filter substrate 16.

By controlling the amount of slurry used, the distance that the slurry is forced into the channels, the strength and duration of the vacuum, and the ends to which the vacuum is applied, the position of the washcoat along the length "L" of the inlet and/or outlet channels 26, 28 in the diesel particulate filter substrate 16 can be controlled. In this manner, the washcoat loading may be biased towards either the inlet end 30 or the outlet end 32 of either the inlet channels 26, the outlet channels 28, or both the inlet and outlet channels of the particulate filter substrate 16. This method may be applied for any number of coating applications.

After the washcoat slurry is applied to the substrate 16 and the excess slurry is removed, the coated part is calcined at high temperature (e.g. >450° C.) in oven to decompose any organic component from raw material, evaporate water, and fix the washcoat to the substrate 16.

EXAMPLES

Example 1

Figure 3:
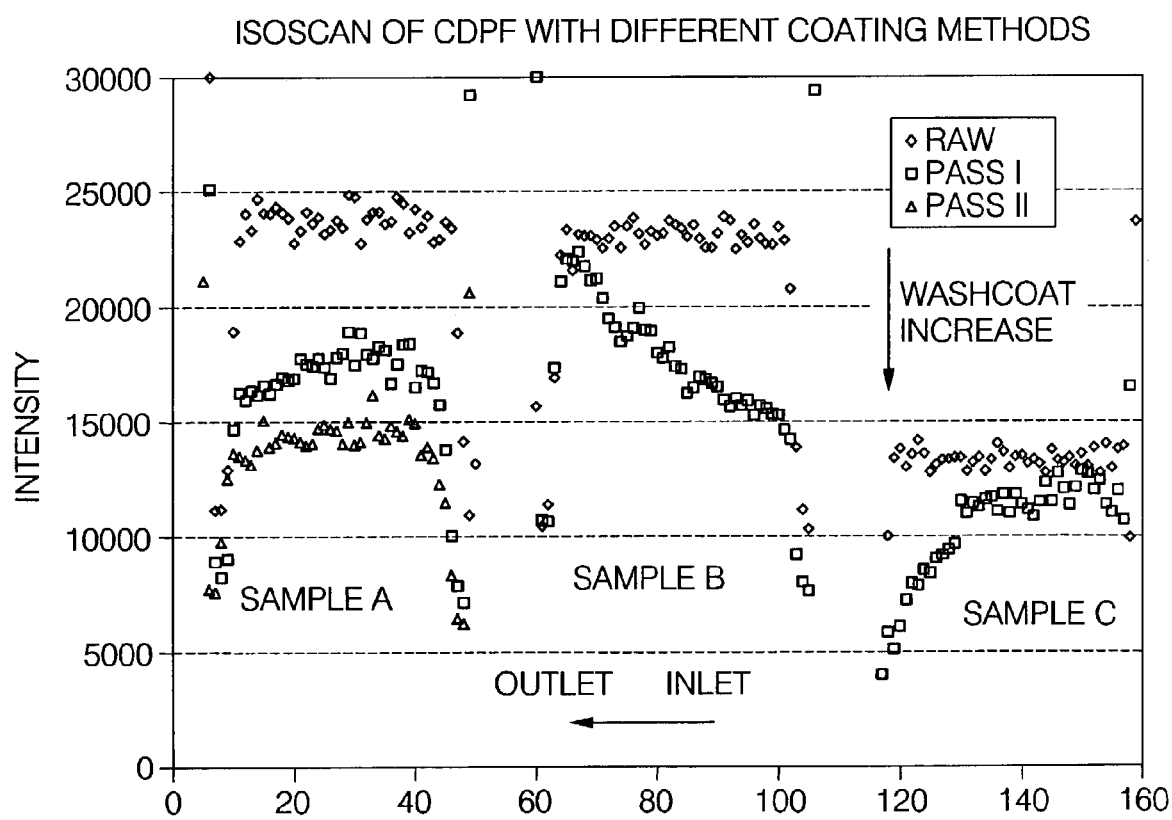
FIG. 3 shows an isoscan plot of: a particulate filter substrate having washcoat evenly distributed, a particulate filter substrate having washcoat heavily loaded at an inlet portion, and a particulate filter substrate having washcoat heavily loaded at an outlet portion.

Sample A—A Particulate Filter Substrate Having an Evenly Coated Washcoat Throughout the Inlet Channels To evenly load washcoat throughout the inlet channels of the particulate filter substrate, an amount of washcoat slurry and its solid content is selected to allow an even number of applications, with each application having slurry fully forced into the inlet channels of the particulate filter (100% of L). In the first application, the washcoat slurry is fully forced into the inlet channels via the inlet end of the filter substrate. A first clearing is then accomplished by applying a vacuum to the outlet end of the filter substrate such that the vacuum draws the washcoat slurry in the same direction that it was forced into the particulate filter substrate. Next, the particulate filter substrate is flipped and the vacuum is applied to the inlet end to draw the excess washcoat slurry in an opposite direction, toward the inlet end. An isoscan of a particulate filter substrate is shown in FIG. 3 at Sample A. As shown in FIG. 3 for Sample A, the first coating application (pass) loads more washcoat at the outlet end of the inlet channels in filter substrate. Next, the washcoat slurry is again forced to travel along the entire length of the inlet channels via the inlet end. The vacuum is then applied to the inlet end to draw the excess slurry in a direction opposite to that in which it was applied. The filter substrate is then flipped and a second vacuum clearing is applied to the outlet end. As shown in FIG. 3 for sample A, after the second pass, the washcoat distribution is substantially even throughout the particulate filter substrate.

Example 2

Sample B—Washcoat Loading Biased Towards the Inlet End of the Inlet Channels

Loading more washcoat at the inlet end of the inlet channels can be achieved by forcing slurry only partially into the inlet channels of the particulate filter substrate (e.g., 50% of L), followed by application of vacuum to the inlet end. The washcoat gradient (i.e., arrangement of catalytically active material) is generated with higher washcoat loading toward the inlet end. Sample B in FIG. 2 demonstrates a particulate filter substrate having a coating formed by this process using a 50% slurry filling (50% of L). As can be seen in FIG. 2 at Sample B, there is almost no washcoat near the outlet end of the particulate filter substrate.

Example 3

Sample C—Washcoat Loading Biased Towards the Outlet End of the Inlet Channels of the Particulate Filter Substrate Loading more washcoat toward the outlet end of the inlet channels can be achieved by using one-pass application and 100% slurry fill (100% of L). In the application, the washcoat slurry is fully forced into the inlet channels via the inlet end of the filter substrate. A vacuum is then applied to the outlet end of the filter substrate, followed by applying vacuum to the inlet end, causing the slurry to move towards the outlet end. Sample C in FIG. 2 demonstrates a particulate filter substrate having a coating formed by this process. As can be seen in FIG. 2 at Sample C, there is almost no washcoat near the inlet end of the particulate filter substrate.

Example 4

Partially Loaded Washcoat Only at the Inlet Portion of the Particulate Filter Substrate Loading more washcoat at the inlet end of the inlet channels can be achieved by forcing slurry only partially into the inlet channels of the particulate filter substrate (e.g., 50% of L), followed by a removing excessive slurry from inlet end, for example, by an application of vacuum to the inlet end. By controlling the amount of slurry forced into the channels, the length of washcoat at the inlet end can be controlled.

Described herein is a method for controlling the washcoat distribution along the channels of a coated particulate filter substrate. The method allows for anisotropically coating a particulate filter substrate, which provides for an uneven distribution of catalytically active material within the channels of a particulate filter substrate. By controlling the location of the washcoat in the particulate filter substrate, the backpressure caused by the coated particulate filter may be controlled. The catalytic activity of the particulate matter reduction may also be improved by allowing more catalyst loaded on the substrate, and by advantageously locating the catalytic washcoat where heat from upstream engine exhaust can be better utilized.

While the invention has been described with reference to an exemplary embodiment, it will be understood by those skilled in the art that various changes may be made and equivalents may be substituted for substrates thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of distributing a washcoat along channels of a particulate filter substrate, the method comprising:
   forcing a washcoat slurry a predetermined distance into the channels, the predetermined distance being less than or equal to the full length of the channels;
   clearing the channels by removing an excess amount of washcoat slurry from the channels; and
   arranging a remainder of the washcoat slurry within the channels, the arranging including applying a first vacuum to a first end of the particulate filter substrate after clearing the channels.

2. The method of claim 1, wherein the clearing the channels includes:
   applying a second vacuum to a second end of the particulate filter substrate.

3. The method of claim 1, wherein the arranging further includes:
   applying a second vacuum to a second end of the particulate filter substrate.

4. The method of claim 1, wherein clearing the channels includes applying the first vacuum to the first end of the particulate filter substrate, and the arranging includes applying the first vacuum to the first end for a predetermined time after the excess amount of washcoat slurry has been removed from the channels.

5. The method of claim 1, wherein the washcoat slurry is forced into the channels through the first end of the particulate filter substrate, and clearing the channels includes applying a second vacuum to a second end of the particulate filter substrate.

6. The method of claim 5, further comprising:
   forcing a second washcoat slurry a second predetermined distance into the channels through the first end after the arranging of the washcoat slurry;
   clearing the channels by removing an excess amount of the second washcoat slurry from the channels; and
   arranging a remainder of the second washcoat slurry within the channels, the arranging including applying a third vacuum to one of the first and second ends of the particulate filter substrate after clearing the excess amount of the second washcoat slurry from the channels.

7. The method of claim 6, wherein the first and second predetermined distances are each equal to the full length of the channels.

8. The method of claim 1, wherein the arranging provides a layer of a washcoat composition comprising a catalytically active material arranged anisotropically along a length of the channels of the particulate filter substrate.

9. A method of distributing a washcoat along channels of a particulate filter substrate, the method comprising:
   forcing a washcoat slurry a predetermined distance into the channels;
   applying a first vacuum to a first end of the particulate filter substrate to clear an excess amount washcoat slurry from the channels; and
   applying a second vacuum to a second end of the particulate filter substrate to arrange a remainder of the washcoat slurry within the channels.

10. The method of claim 9, wherein the predetermined distance is less than or equal to the full length of the channels.

11. The method of claim 9, further comprising:
    after applying the second vacuum, applying a third vacuum to at least one of the first end and the second end of the particulate filter substrate to further arrange the remainder of the washcoat slurry within the channels.

12. The method of claim 9, wherein the applying the second vacuum provides a layer of a washcoat composition comprising a catalytically active material arranged anisotropically along a length of the channels of the particulate filter substrate.

* * * * *